US009342851B2

(12) United States Patent
Musil

(10) Patent No.: US 9,342,851 B2
(45) Date of Patent: May 17, 2016

(54) SYSTEMS AND METHODS FOR AGGREGATING AND FILTERING CONTENT OF SOCIAL MEDIA ACTIVITY

(75) Inventor: Alexander Musil, London (GB)

(73) Assignee: Shazam Entertainment Ltd., London (GB)

( * ) Notice: Subject to any disclaimer, the term of this patent is extended or adjusted under 35 U.S.C. 154(b) by 636 days.

(21) Appl. No.: 13/420,387

(22) Filed: Mar. 14, 2012

(65) Prior Publication Data

US 2012/0239763 A1 Sep. 20, 2012

Related U.S. Application Data

(60) Provisional application No. 61/452,438, filed on Mar. 14, 2011.

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC .................................................... G06Q 50/01
USPC ....................................................... 709/206
See application file for complete search history.

(56) References Cited

U.S. PATENT DOCUMENTS

| | | | | |
|---|---|---|---|---|
| 8,161,071 | B2 * | 4/2012 | LaJoie et al. | 707/791 |
| 2007/0136286 | A1 * | 6/2007 | Webster et al. | 707/7 |
| 2011/0004831 | A1 * | 1/2011 | Steinberg et al. | 715/753 |
| 2011/0137902 | A1 * | 6/2011 | Wable et al. | 707/737 |

* cited by examiner

*Primary Examiner* — Andrew Georgandellis
(74) *Attorney, Agent, or Firm* — McDonnell Boehnen Hulbert & Berghoff LLP

(57) ABSTRACT

Systems and methods for aggregating and filtering content of social media activity are provided. In one example, a method includes receiving content posted to a social network and associated with a user profile. The social network comprises a network of users that are related via one or more relationships indicating a type of connection between respective users, and the content posted to the social network includes a plurality of distinct data sets. The method also includes processing the plurality of distinct data sets to identify one or more respective data sets being indicative of media content, and filtering the one or more respective data sets based on a type of media content indicated by the one or more respective data sets. The method further includes providing within the social network for the user profile the content in an order based on the filtering.

19 Claims, 6 Drawing Sheets

SYSTEMS AND METHODS FOR AGGREGATING AND FILTERING CONTENT OF SOCIAL MEDIA ACTIVITY

CROSS REFERENCE TO RELATED APPLICATION

The present application claims priority to U.S. provisional application Ser. No. 61/452,438 filed on Mar. 14, 2011, the entire contents of which are herein incorporated by reference.

FIELD

The present disclosure relates generally to the viewing, processing and delivery of communication and social network activity.

BACKGROUND

Various communication and social networks have proprietary facilities to filter and/or search content on respective networks. For example, a user of a social network may search contents of the network for information relating to another user of the social network. However, when looking to obtain multi-variable search results, these facilities can be difficult to use or may not support desired capabilities.

SUMMARY

Examples provided in the disclosure may describe, inter alia, systems and methods of filtering content of one or more social networks for a desired result.

Any of the methods described herein may be provided in a form of instructions stored on a non-transitory, computer readable medium, that when executed by a computing device, perform functions of the method. Further embodiments may also include articles of manufacture including a tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in processes or methods described herein.

DETAILED DESCRIPTION

Figure 1:
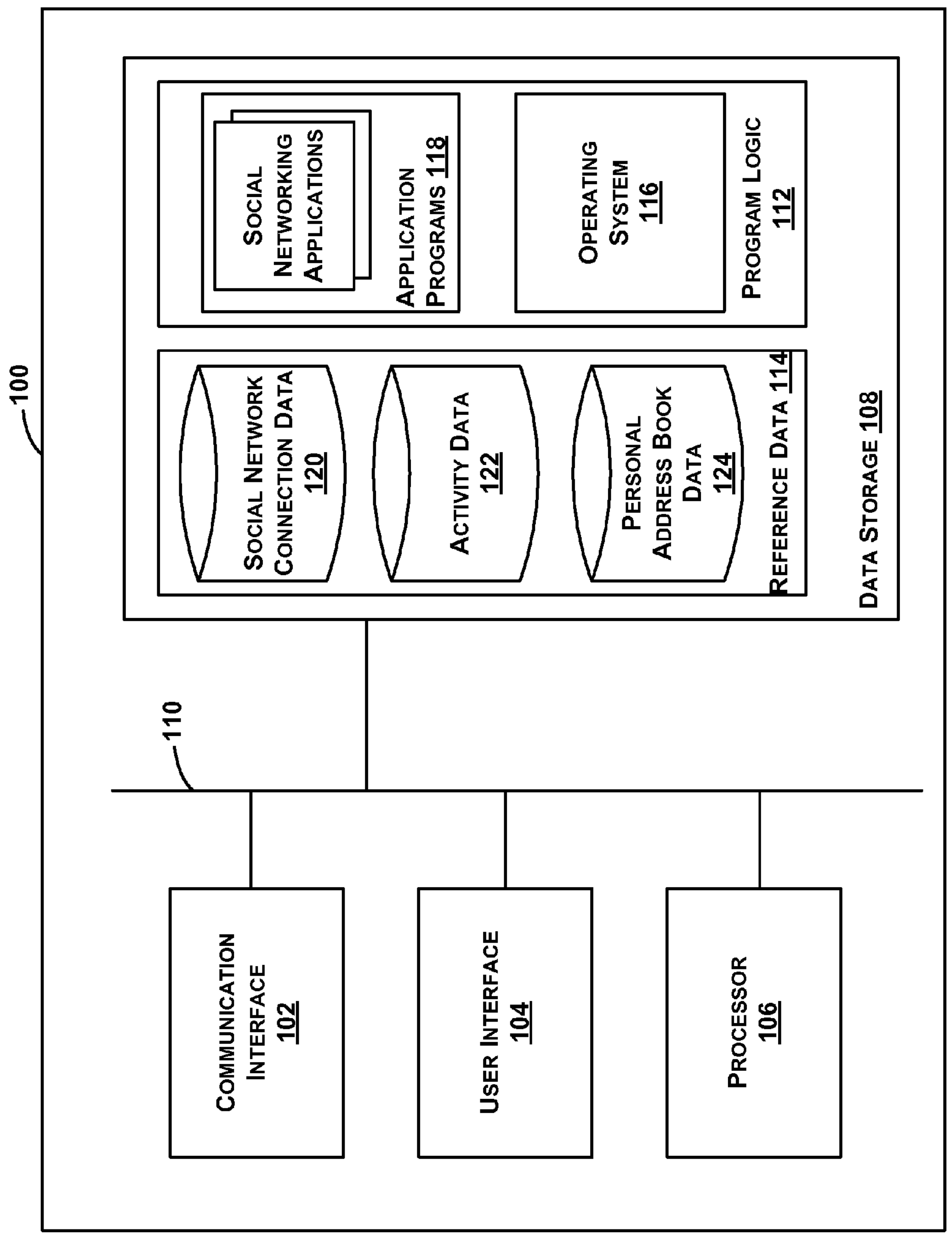
FIG. 1 illustrates a block diagram showing components of an example device that may be used to connect or otherwise communicate with a social network.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure may describe, inter alia, systems and methods of filtering content of one or more social networks for a desired result. Additional methods may be provided to configure different heuristics by topic to enable filtering by a user. In one example, default heuristics may be provided for music, television, movies, books and radio. In other examples, users may customize filtering based on preferences. Still additional methods may be provided to configure views, comments, and ratings on a social network, as well as to enable playback and/or purchase of filtered content via the social network.

I. Example Social Networks

Any number of digital communication or social networks may be used, accessed, or processed to obtain a data set. A social network may include an online service, platform, or website that allows building and reflecting of social relations among people, e.g., who share interests and/or activities. Social networking sites allow users to share ideas, activities, events, and interests within their individual networks. As such, social network services may be web-based (or Internet based) and provide for users to interact over the Internet, such as e-mail and instant messaging. In some examples, social network services may include an individual-centered service or an online community service (e.g., group-centered). Example social network services include Facebook®, Twitter®, MySpace®, LinkedIn® , Nexopia®, Bebo®, and Hi5®. Others exist as well.

A social network website may include a representation of each user (often a profile), his/her social links, and a variety of additional services. For example, a social network may operate, for example, using a network of servers that host websites allowing users to create personal profiles, add other users as friends, exchange messages including automatic notifications when a user updates a profile, communicate with friends and other users through private or public messages and chat features, etc.

Social networking services may include category based services (such as former school-year or classmates), services to connect with friends (usually with self-description pages), and recommendations of systems linked to trust. For example, users of a social network may join common interest user groups, organized by workplace, school, or college, or other characteristics.

FIG. 1 illustrates a block diagram showing components of an example device 100 that may be used to connect or otherwise communicate with a social network. In practice, some of these components or their functions may be distributed across multiple devices. However, the components are shown and described as part of a representative device for sake of example. The device may be or include a wireless computing device, a wireless telephone device, a personal computer, a personal digital assistant, etc., or a combination of such devices, or may be configured to have a combination of functions of such devices.

As shown in FIG. 1, the device 100 includes a communication interface 102, a user interface 104, a processor 106, and data storage 108, all of which may be communicatively linked together by a system bus, network, or other connection mechanism 110.

The communication interface 102 may function to allow the device 100 to communicate with access networks and/or transport networks so as to facilitate calling, social-network interaction, and implementation of example methods described herein. For instance, the communication interface 102 may include a chipset and antenna arranged for wireless communication with a radio access network such as a radio access network (RAN) that may provide connectivity with one or more other entities, such as to facilitate calling and/or social-network interaction. Alternatively or additionally, the communication interface 102 may include a telephone or Ethernet interface arranged to couple with a landline or wireless connection, that provides connectivity with one or more transports to similarly facilitate calling and/or social-network interaction.

The user interface 104 may function to allow the device 100 to interact with a first party or user, such as to receive input from the first party and to provide output to the first party. As such, the user interface 104 may include input components such as a keypad or keyboard, a touch-sensitive panel, a microphone, and a video camera, and the user interface 104 may include output components such as a display screen and a sound speaker.

The processor 106 may comprise one or more general purpose processors (e.g., microprocessors) and/or one or more special purpose processors (e.g., digital signal processors, or application specific integrated circuits). The data storage 106 may include one or more volatile and/or non-volatile storage components, such as magnetic, optical, flash, or organic storage, and may be integrated in whole or in part with processor 106. As shown, the data storage 108 of the device 100 includes program logic 112 and reference data 114.

The program logic 112 may take the form of machine language instructions or other logic executable or interpretable by the processor 106 to carry out various functions described herein. By way of example, as shown, the program logic 112 may include an operating system 116 and one or more application programs 118 installed on the operating system. Distributed among the operating system 116 and/or application programs 118 may then be program logic 112 for providing calling functionality, social-network interaction functionality, and functions specific to example methods described herein. As shown, for instance, the application programs 118 may include one or more social-networking applications each arranged to interwork with a respective social-networking service. The operating system 116 may include logic specific to the methods described herein.

The reference data 114 may include social-network connection data 120, communication activity data 122, and a personal address book data 124. The connection data 120 may be maintained and managed by the social-networking applications and, for each social-networking application corresponding with a social-networking service, may specify the connections in each of one or more social-network groups defined for the first party in that social-networking service. Each social-network connection may be specified by connection data and may include respective identifying information, such as a social-networking username or the like to identify the party with whom the first party is connected in the social-network. The communication activity data 122 may be maintained and managed (e.g., by a server or server module) to provide a record of individual communications, such as any current communications and any past communications, involving the first party. The communication activity data 122 may take the form of a communication-log listing sent communications, received communications, communication type, communication content, a time and/or date of the communication, etc. Each time the device 100 engages in or is the subject of a communication or communications attempt, the operating system may update this communication activity data 122 to indicate the additional communication activity. The personal address book data 124 may take the form of an address book that lists various contacts, such as people or organizations that the first party might chose to contact. In some cases, the personal address book data 124 may contain some of a user's social-network connection data. For instance, data may be added to a contact in the personal address book data an indication of whether the contact is a member of the user's social-network group for each of one or more social-networking services.

Figure 2:
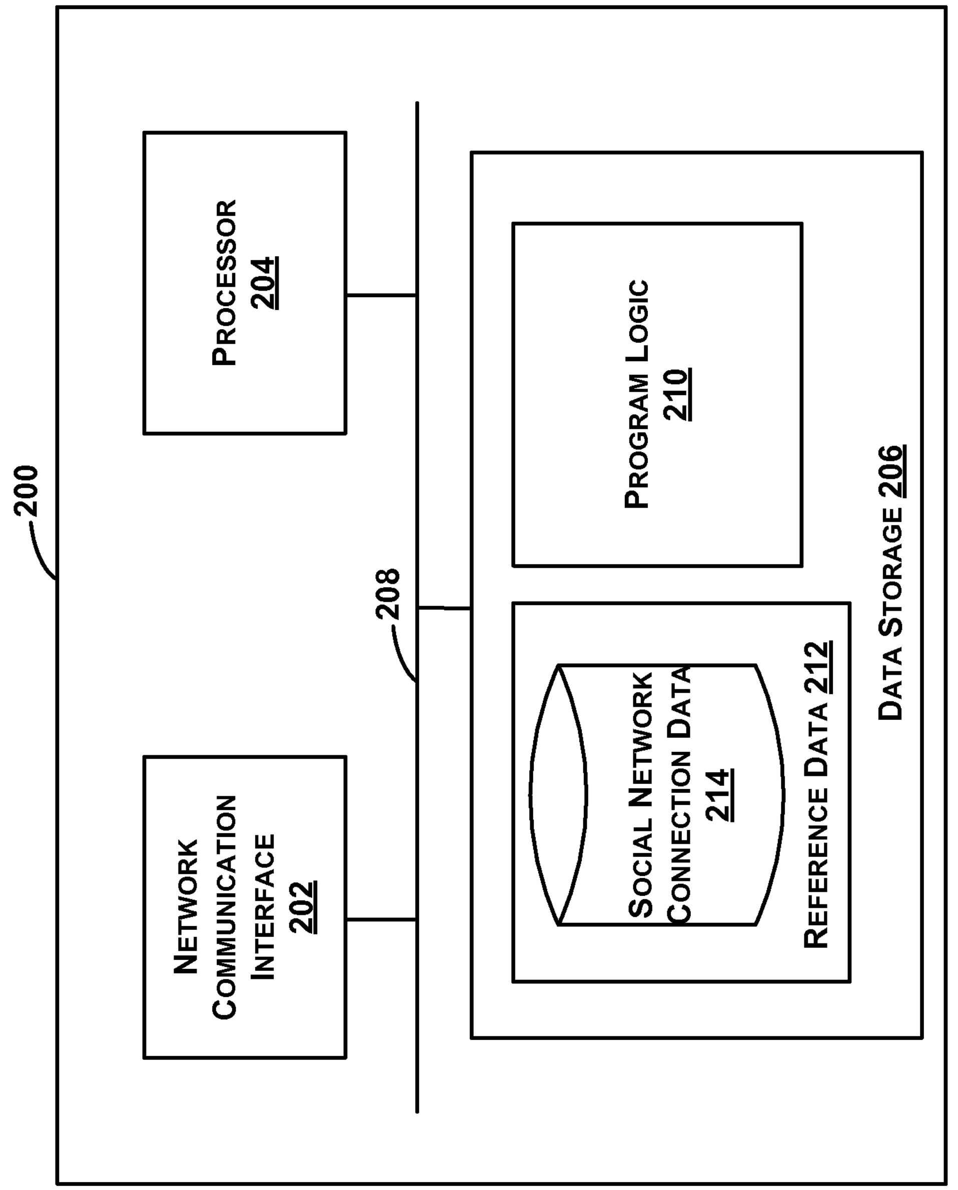
FIG. 2 illustrates a block diagram showing some of the components of an example social-networking server that can be used in example methods described herein.

FIG. 2 illustrates a block diagram showing some of the components of an example social-networking server 200 that can be used in example methods described herein. In practice, the social-networking server 200 may host a social-networking service, and may thus maintain or have access to profile data, including connection data, of numerous social-network members and may interact with its members and manage the social-network connections and interactions of its members.

As shown in FIG. 2, the example social-networking server 200 includes a network communication interface 202, a processor 204, and data storage 206, all of which may be communicatively linked together by a system bus, network, or other connection mechanism 208.

The network communication interface 202 may function to allow the social-networking server 200 to communicate with various other network entities and end user devices, such as social network members, through one or more connections. For example, the network communication interface 214 may comprise an Ethernet network connection module.

The processor 204 may comprise one or more general purpose processors (e.g., microprocessors) and/or one or more special purpose processors (e.g., digital signal processors, or application specific integrated circuits). Data storage 206 may include one or more volatile and/or non-volatile storage components, such as magnetic, optical, flash, or organic storage, and may be integrated in whole or in part with processor 204. As shown, the data storage 206 may include program logic 210 and reference data 212.

The program logic 210 may take the form of machine language instructions or other logic executable or interpretable by the processor 204 to carry out various social-networking server functions described herein. For instance, the program logic 210 may be executable to carry out general social-networking server functions including maintaining and managing member connections and interactions for instance. Further, the program logic 210 may include logic specific to implementation of example methods described herein. The reference data 212 may then include profile data for each member of the social-network, including for each member definitions of one or more social-network groups and, for each social-network group, connection data 214 specifying social-network connections defined for the member.

II. Example Filtering of Social Network Activity

Example embodiments provide a method for aggregating and filtering social network activity by topic of online relationships, as established by the digital communication and social networks, for a specific person. An individual may authenticate with their network(s) to give a filter system access to activity of their online relationships in entirety. A data set can be aggregated from the individual's social network of activity (e.g., online relationships), and can be aggregated across multiple networks if applicable. Aggregation may be performed based on the authentication and permissions granted by the specific communication and social networks per user.

The social network of activity may be generated by a user's connections or a group of user's connections on the social network. The activity may comprise individual data units, often termed "posts", "updates" or "status messages", hereafter referred to as posts. The posts can be evaluated individually as to their applicability to a specific topic, such as, by processing content of the posts.

Posts can be aggregated and parsed for identification of activity by topic; for example, activity related to music, TV, movies, books, radio or other types as defined in the system. The data parsing can be based on a range of characteristics, or based on any number of evaluation criteria. The evaluation criteria may include evaluating a network origin of content of the post, a source of the post, a contributing application of content of the post (if applicable), an individual's relationship to a contributor of the post, and a preference set by the individual for a given characteristic/relationship/network, for example. Other criteria includes evaluating based on a media types used in content of the post (e.g., media types include text files, music files, other media files, etc.), key words used in content of the post or other content within the activity data itself such as text, audio, video, or images, an entity (individual, company, etc) who composed the post (entity who input content of the post or an identification of an application or software that input content of the post), URLs linked to from the post or included within content of the post, metadata included in content of the post or connected to the post, and an originating device type (e.g., mobile phone) used to enter content of the post, for example.

Example embodiments enable configuration of any number of evaluation criteria to process social network activity. Combinations of the above criteria may determine a filter result for a given topic. A processor may analyze each of individual posts in a user's social network to filter the posts based on selected criteria.

As an example, a "music filter" may be configured to filter content from any of:

- Posts from source applications that are concerned with music (e.g., Spotify)
- Posts with audio files media types, possible in conjunction with specific keyword(s)
- Posts with music related keywords (e.g. "music", "song")
- Posts input by musical artists, record companies, labels, etc.
- Posts that contain URLs linking to music websites (e.g., Last.fm)
- Posts that include Facebook Open Graph XML IDs of the type "song" or "artist"
- Posts originating from online connected radios (e.g., Squeezebox)

Filters may be customized based on any number of evaluation criteria. In addition, pre-configured filters may be provided for music, television, movies, books and radio, for example.

As another example, a music filter may be configured to filter content from any posts that are made by or linked to a music application (e.g., Pandora®, etc.), that include music media in the post (e.g., music file, video), that include any music keywords (e.g., album titles, song names), that are made by a music artist, that include URLs linking to music related domains, etc. Each individual post of a user's social network can be analyzed to apply the criteria to determine if the post qualifies as being musically related.

To filter the posts, content within the posts may be parsed and filtered using semantic filters, for example. In addition, search engines may be used to identify whether content in a post matches to criteria set for filtering. In this regard, media search engines may be provided and may include or have access to databases that index media streams, for example, to compare the content in the posts with the stored information so as to identify media associated with the posts.

Still further, content within the posts may be compared to content within a database that contains lists of information that qualifies according to a specific filter. For example, the database may contain a list of all qualifying music related applications, a database of music artists, song titles, album titles, music related URLs, etc., and posts may be processed by accessing the database and searching for content that matches content contained within the post.

As specific examples, a user may to authenticate to Facebook® and Twitter® (e.g., login) and filter post content to view: all television related posts from their connections, movie related posts from their friends and movie trailers associated with the post content, and which of their friends are fans and/or reading books by a particular author, for example. In addition, users may authenticate to a social network and input a post indicating that they are watching a specific TV show, and then filter posts to identify which of their friends are also watching the same show.

Still further, a user may designate specific friends on a social network as music influencers relative to their other friends such that their posts are prioritized higher when viewing. Users may also comment on and rate the musical and TV tastes of their friends.

The posts can be displayed according to the filters. Example embodiments enable a user to view all music related information about friends on social networks. A given user can see activity of friends, and using filters, can view musically related posts, for example. A user can then be presented with an aggregated and filtered view of data for perusal, commenting, rating, playback, purchase and other actions.

In addition, a user may maintain relationships and connections across multiple social networks and may desire a unified view of a search result. Example embodiments provide for aggregating facilities to achieve the desired result.

Figure 3:
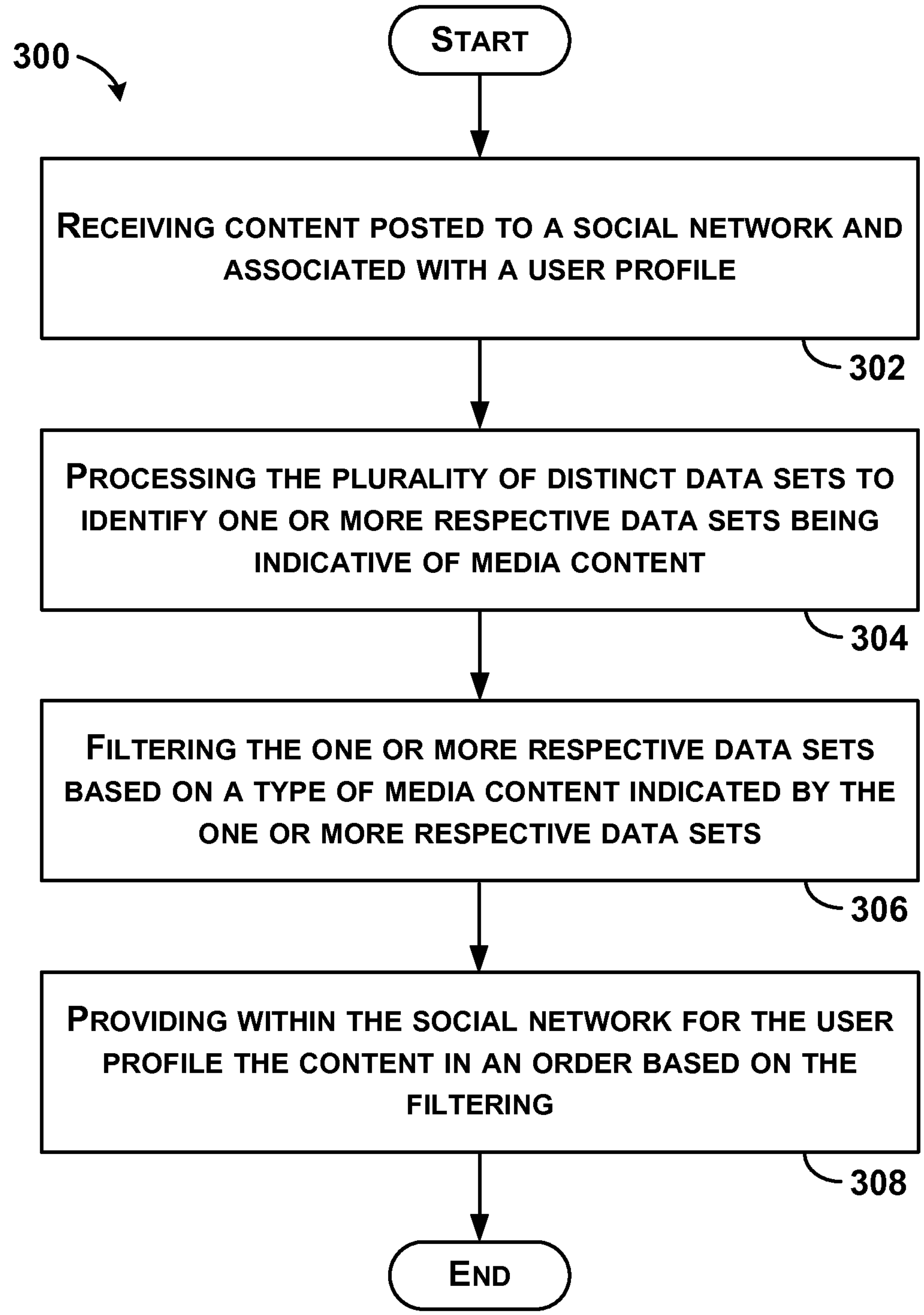
FIG. 3 shows a flowchart of an example method for filtering social network activity.

FIG. 3 shows a flowchart of an example method 300 for filtering social network activity. Method 300 shown in FIG. 3 presents an embodiment of a method that, for example, could be used with the device or system shown in FIG. 1-2. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 3 may represent circuitry that is wired to perform the specific logical functions in the process.

At block 302, the method 300 includes receiving content posted to a social network and associated with a user profile. The social network may comprise a network of users that are related via one or more relationships indicating a type of connection between respective users, and the content posted to the social network includes a plurality of distinct data sets. As one example, the social network may include Facebook®, and the distinct data sets may include respective posts to a wall of a user, an update to a post, or a status message.

At block 304, the method 300 includes processing the plurality of distinct data sets to identify one or more respective data sets being indicative of media content. As an example, a post to a social network may include a title of a song, lyrics of a song, a sample of a song/tv show, etc., and may be identified as indicative of media content. The data sets may be processed by performing semantic recognition of text of the data sets, or performing a content identification of the content. The data sets may be processed by providing content of the data sets to a content recognition server or search engine, and receiving from the content recognition server or search engine a listing of data sets that are indicative of media content.

At block 306, the method 300 includes filtering the one or more respective data sets based on a type of media content indicated by the one or more respective data sets. As an example, the data sets may be filtered based on types of media content including songs, television, movies, books, etc.

As one example, the data sets may be filtered by comparing the content of the data sets with stored information so as to identify media associated with the one or more data sets. The stored information may include stored recordings of songs, movies, or television shows.

As another example, the method 300 may include filtering data sets based on a priority associated with designated related users of the social network. A designed related user may be associated with a type of media content, such as music, and when content is posted by the designated user, the content may be filtered according to a music filter.

In some examples, block 306 may further include receiving a selection of a predetermined filter from a group of predetermined filters. A predetermined filter may be configured to process content based on one or more of a source application of the content, a media type of the content, and keywords of the content, or other predetermined configurations.

At block 308, the method 300 includes providing within the social network for the user profile the content in an order based on the filtering. As an example, the content may be grouped into respective group data sets based on the order, and provided in the social network in groups. The content may be provided in the social network by generating a display or displaying the content accordingly.

As further examples, the content may be processed based on a network origin of the content, based on a contributing application of the posted content, based on a media type of the posted content, based on text of the posted content, or based on an originating device type used to provide the posted content (e.g., mobile or desktop computer). The content can then be provided in the social network in an order based on the processing.

In one example, the method 300 may be performed across a single social network. In other examples, the method 300 may be performed across multiple social networks. For instance, content posted to multiple social networks can be received and filtered, and a display of aggregated content posted to the multiple social networks can be provided to display the aggregated content in an order based on the filtering.

III. Example Content Identification within Social Network Activity

In additional embodiments, information within posts may be associated with certain content, and the content can be identified and/or provided to a user. For example, information within a post may be associated with a song. The system may identify the song, based on song title, album title, artist, lyrics of the song, etc., by accessing a database of songs, artists, lyrics, etc. The system may then associate a copy of the song (e.g., media file) with the post to allow a user to preview or purchase the song.

In other examples, the system may allow the user to associate the song or add the song to a list of songs maintained by the user, such as a list of songs "tagged" by the user using content identification services, such as provided by Shazam Entertainment in London, United Kingdom, Gracenote in Emeryville, Calif., or Melodis in San Jose, Calif., for example, that may operate to receive samples of environmental audio, identify a musical content of the audio sample, and provide the user with information about the music, including the track name, artist, album, artwork, biography, discography, concert tickets, etc.

As such, the system may identify media related to or identified within the posts, and provide or associate other information with the posts based on the identified media. Thus, the system may access a media stream library database to select media associated with or corresponding to content within a post that may then be provided to the user or rendered by the system. Databases may be provided that include media recordings and each recording may be identified by a unique identifier (e.g., sound_ID). The database may not store audio or video files for each recording, since the sound_IDs can be used to retrieve audio files from elsewhere. However, the database may store the audio or video files in some examples. The database may also include information for each stored audio, video, or media file, or for each stored media index. For example, metadata may be stored with each file that indicates information about the file, such as an artist name, a length of song, lyrics of the song, time indices for lines or words of the lyrics, album artwork, graphics/images to display for the song or while the song is playing, or any other identifying or related information to the file.

Various content identification techniques are known in the art for performing computational content identifications of media samples and features of media samples using a database of media tracks. The following U.S. Patents and publications describe possible examples for media recognition techniques, and each is entirely incorporated herein by reference, as if fully set forth in this description: Kenyon et al, U.S. Pat. No. 4,843,562, entitled "Broadcast Information Classification System and Method"; Kenyon, U.S. Pat. No. 4,450, 531, entitled "Broadcast Signal Recognition System and Method"; Haitsma et al, U.S. Patent Application Publication No. 2008/0263360, entitled "Generating and Matching Hashes of Multimedia Content"; Wang and Culbert, U.S. Pat. No. 7,627,477, entitled "Robust and Invariant Audio Pattern Matching"; Wang, Avery, U.S. Patent Application Publication No. 2007/0143777, entitled "Method and Apparatus for Identification of Broadcast Source"; Wang and Smith, U.S. Pat. No. 6,990,453, entitled "System and Methods for Recognizing Sound and Music Signals in High Noise and Distortion"; Blum, et al, U.S. Pat. No. 5,918,223, entitled "Method and Article of Manufacture for Content-Based Analysis, Storage, Retrieval, and Segmentation of Audio Information"; and Master, et al, U.S. Patent Application Publication No. 2010/0145708, entitled "System and Method for Identifying Original Music".

Figure 4:
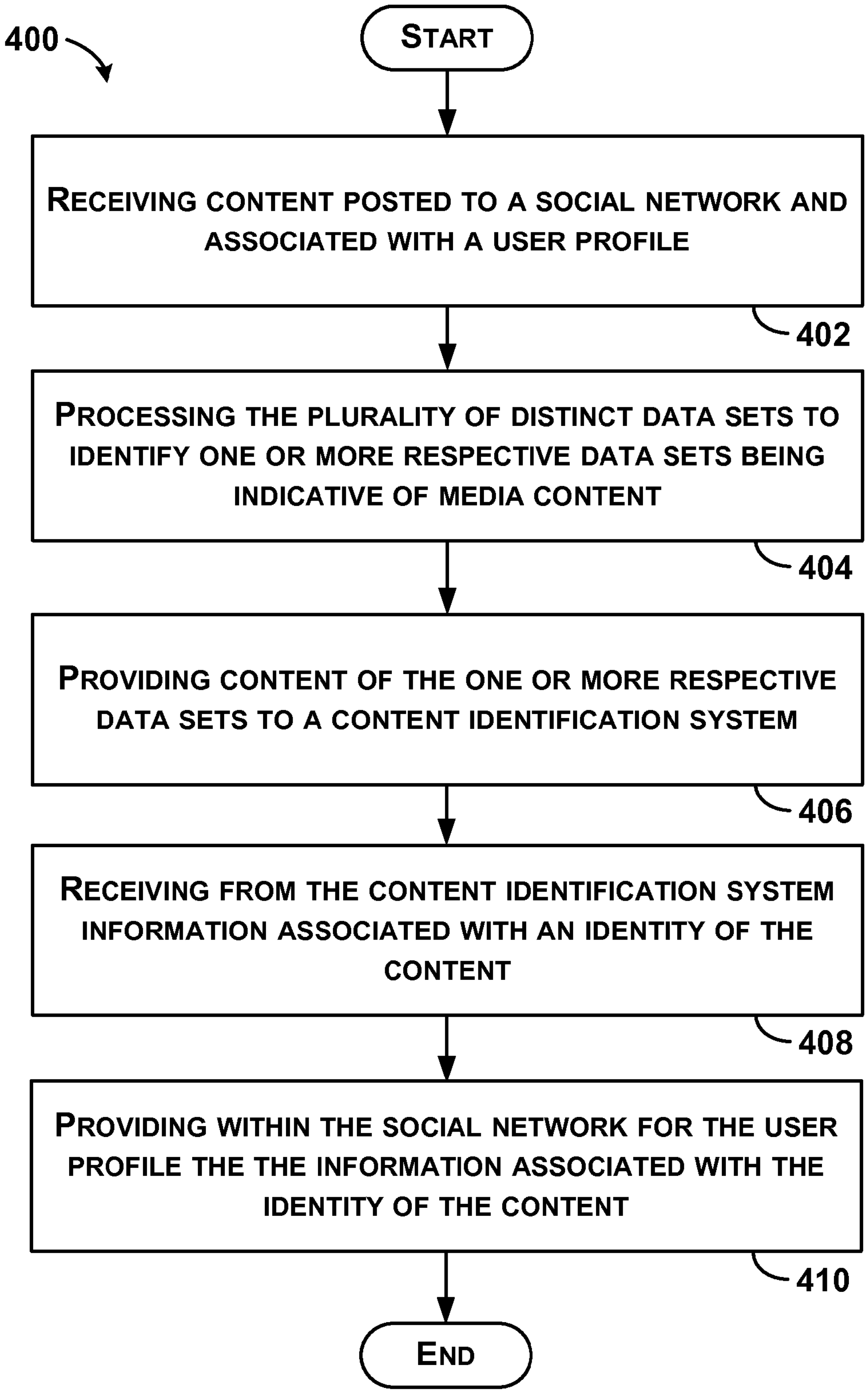
FIG. 4 shows a flowchart of an example method for providing additional information within the social network based on social network activity.

FIG. 4 shows a flowchart of an example method 400 for providing additional information within the social network based on social network activity. Method 400 shown in FIG. 4 presents an embodiment of a method that, for example, could be used with the device or system shown in FIG. 1-2. Method 400 may include one or more operations, functions, or actions as illustrated by one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 402, the method 400 includes receiving content posted to a social network and associated with a user profile, and block 404 includes processing the plurality of distinct data sets to identify one or more respective data sets being indicative of media content. Blocks 402 and 404 may be similar to blocks 302 and 304 of FIG. 3, for example.

At block 406, the method 400 includes providing content of the one or more respective data sets to a content identification system.

At block 408, the method 400 includes receiving from the content identification system information associated with an identity of the content. In one example, the information associated with the identity of the content includes one or more of an identity of the content, a media sample of the content, and lyrics of the content.

At block 410, the method 400 includes providing within the social network for the user profile the information associated with the identity of the content. As an example, the content may include a sample of a media stream being rendered by a media rendering source, and the information received from the content identification system may indicate an identity of a recording corresponding to the sample. Thus, the information indicating the identity of the recording may be provided within the social network for the user profile.

As another example, the content may include lyrics of a song, a sample of media corresponding to the song may be received from the content identification system. Thus, the sample of the media may be provided within the social network for the user profile.

Figure 5A:
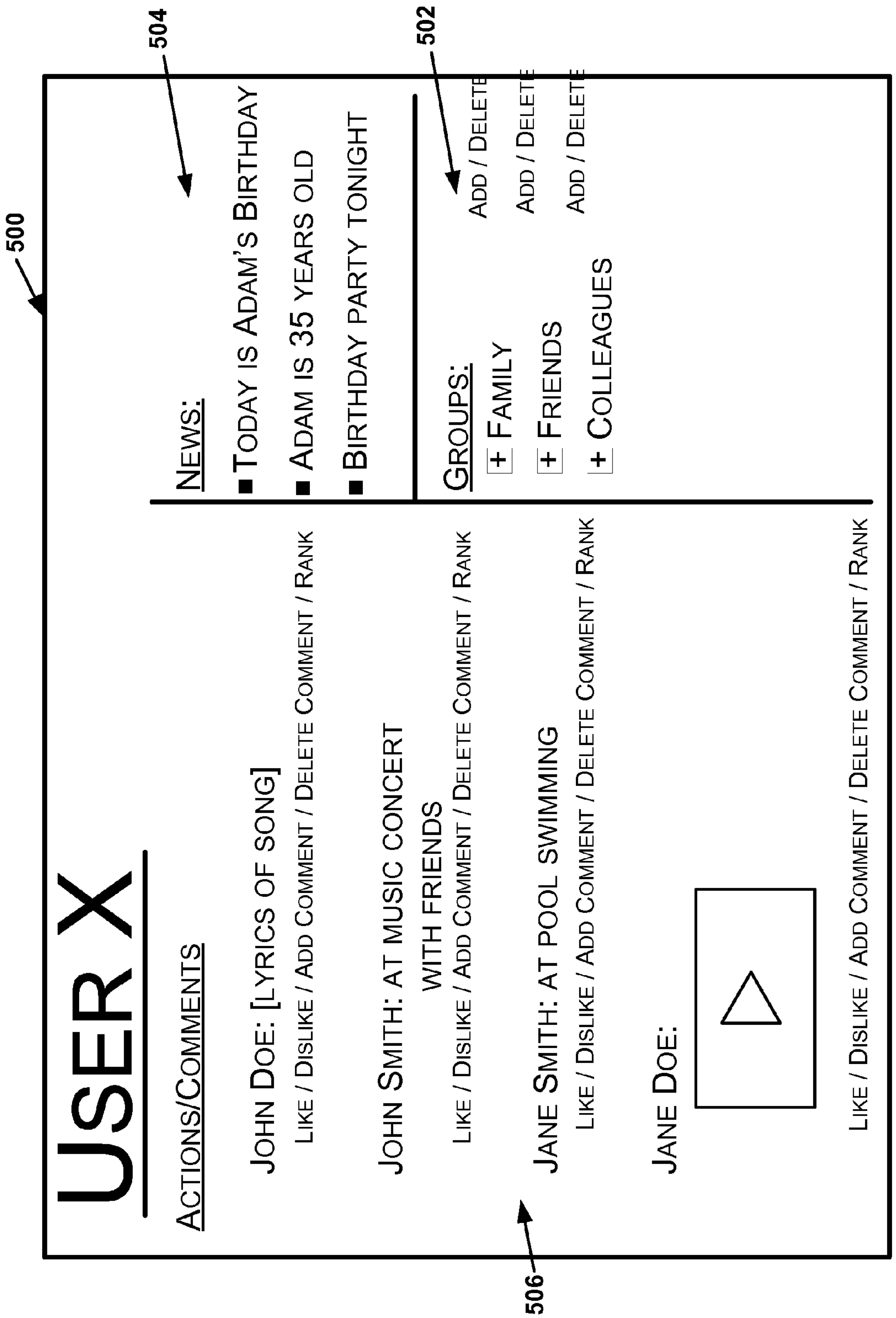
FIGS. 5A-5B includes conceptual illustrations of example social-network pages of a user profile.

FIG. 5A is a conceptual illustration of an example social-network page 500 of a user profile. The social-network page 500 may represent a unique area that may be associated with one or more social-networks and may also be associated with the user profile. Thus, a page may include an area within the social-network or a social-network website.

The social-network page 500 of FIG. 5A is shown to include a variety of data including groups 502, a news data feed 504, and posts 506. All or part of the data in the social-network page 500 may be logged or otherwise stored in a database and associated with the user profile.

The social-network page 500 includes posts 506 of various content. For example, John Doe has posted lyrics of a song, John Music has posted an update indicating at a music concert with friends, Jane Smith has posted an update indicating at pool swimming, and Jane Doe has posted a multimedia sample (audio or video).

Figure 5B:
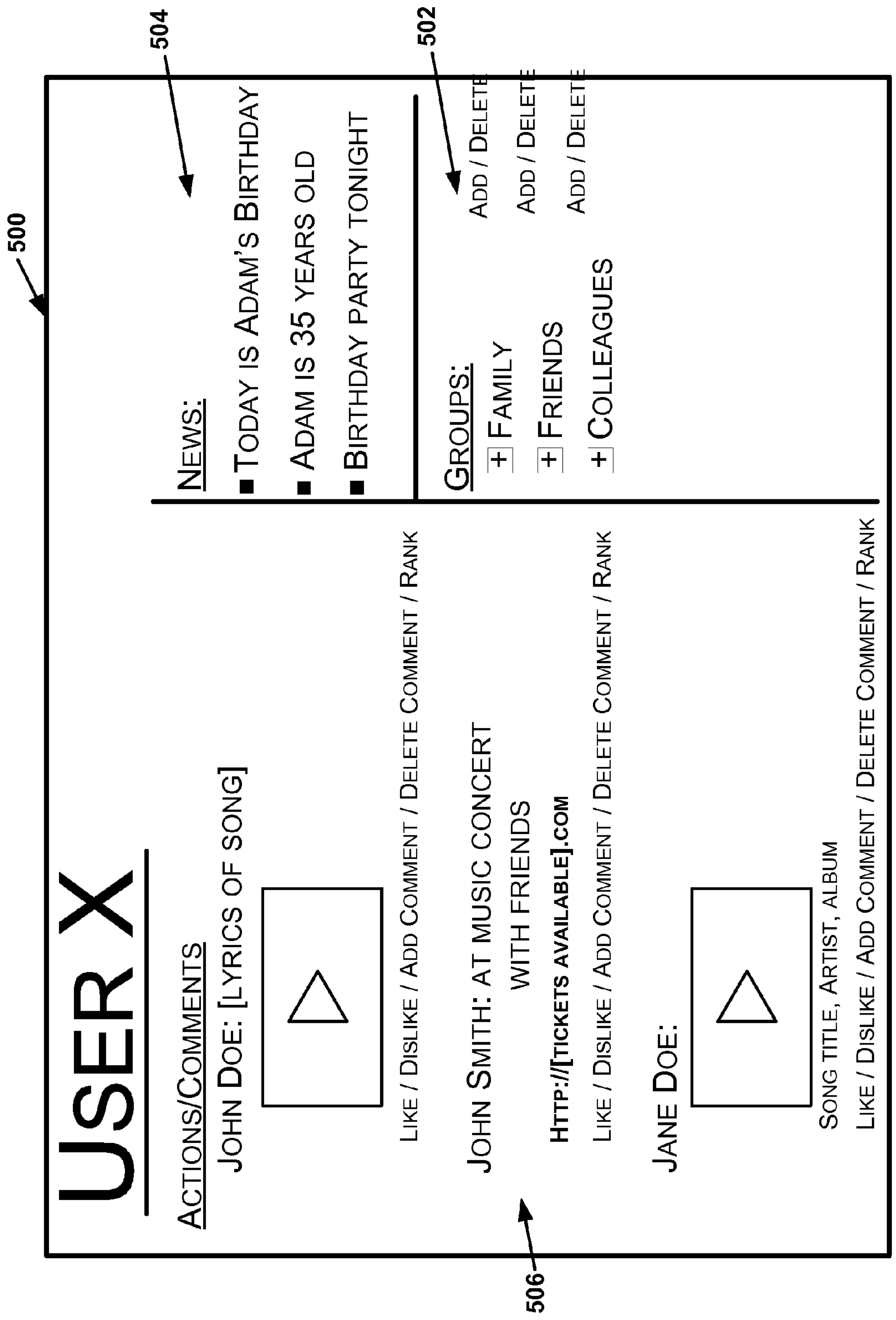

FIG. 5B is a conceptual illustration of the example social-network page 500 after filtering of data and providing information as described in either or both of methods in FIGS. 3-4. As shown in FIG. 5B, all posts not related to any type of media content have been removed, and thus, the post from Jane Smith indicating at pool swimming has been removed. In addition, each of the posts including content related to a type of media have been filtered and additional information has been provided. As examples, a sample of the song has been provided along with the lyrics of the song for the post by John Doe, a link to tickets available for the concert has been provided along with the post by John Smith, and a song title, artist, album has been provided along with the multimedia sample with the post by Jane Doe.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:

receiving content posted to a social network and associated with a user profile, wherein the social network comprises a network of users that are related via one or more relationships indicating a type of connection between respective users, and wherein the content posted to the social network includes a plurality of distinct data sets;

receiving a selection of a predetermined filter from a group of predetermined filters, wherein the predetermined filter processes content based on a file type of content being indicative of audio content;

processing the plurality of distinct data sets, using the predetermined filter, to identify one or more respective data sets being indicative of audio content;

for posts having content with the file type of content being indicative of audio content, filtering content from the posts that include music media content in the post so as to separate music related posts from posts including other audio content;

providing content of the filtered music related posts to a content identification system;

receiving from the content identification system information indicating an identity of the content in the music related posts;

receiving from the content identification system samples of audio content associated with the identity of the content in the music related posts; and providing within the social network for the user profile the samples of audio content as posts in the social network for the user profile along with the information indicating the identity of the content in an order based on the filtering.

2. The method of claim 1, wherein receiving content posted to the social network and associated with the user profile comprises receiving one or more of a post to the social network, an update to a post of the social network and a status message associated with a given user profile.

3. The method of claim 1, wherein filtering the content comprises filtering based on one or more of information indicating music, a television show, a movie, and a book.

4. The method of claim 1, wherein filtering the content comprises:

comparing the content of the one or more respective data sets with stored information so as to identify media associated with the one or more data sets.

5. The method of claim 1, wherein filtering the content comprises:

providing the one or more respective data sets to a search engine; and receiving results from the search engine.

6. The method of claim 1, wherein providing within the social network for the user profile the content in an order based on the filtering comprises grouping the content into respective group data sets.

7. The method of claim 1, further comprising:

processing the content based on a network origin of the content; and providing within the social network for the user profile the content in an order based on the network origin of the content.

8. The method of claim 1, further comprising:

processing the content based on a contributing application of the posted content; and providing within the social network for the user profile the content in an order based on the contributing application of the posted content.

9. The method of claim 1, further comprising:

processing the content based on a media type of the posted content; and providing within the social network for the user profile the content in an order based on the media type of the posted content.

10. The method of claim 1, further comprising:

processing the content based on text of the posted content; and providing within the social network for the user profile the content in an order based on the text of the posted content.

11. The method of claim 1, further comprising:

processing the content based on an originating device type used to provide the posted content; and providing within the social network for the user profile the content in an order based on the originating device type used to provide the posted content.

12. The method of claim 1, further comprising filtering the one or more respective data sets based on a priority associated with designated related users of the social network, wherein a given designated related user is associated with a type of media content.

13. The method of claim 1, further comprising displaying within the social network for the user profile the content in the order based on the filtering.

14. The method of claim 1, further comprising:

receiving content posted to multiple social networks;

filtering the content posted to the multiple social networks based on a type of media content indicated; and providing a display of aggregated content posted to the multiple social networks in an order based on the filtering.

15. The method of claim 1, further comprising filtering content from the posts that include URLs linking to music related domains so as to separate the posts into the music related posts.

16. The method of claim 1, further comprising comparing content from the posts with content in a database that contains qualifying music related applications or qualifying music related URLs; and based on the content from the posts information relating to one of the qualifying music applications or qualifying music related URLs, providing the content to the content identification system.

17. The method of claim 1, further comprising:

accessing a media stream library database to select media associated with or corresponding to the content in the music related posts; and providing the selected media in the posts in the social network for the user profile along with the samples of audio content and the information indicating the identity of the content.

18. A non-transitory computer readable medium having stored therein instructions, that when executed by a computing device, cause the computing device to perform functions comprising:

receiving content posted to a social network and associated with a user profile, wherein the social network comprises a network of users that are related via one or more relationships indicating a type of connection between respective users, and wherein the content posted to the social network includes a plurality of distinct data sets;

receiving a selection of a predetermined filter from a group of predetermined filters, wherein the predetermined filter processes content based on a file type of content being indicative of audio content;

processing the plurality of distinct data sets, using the predetermined filter, to identify one or more respective data sets being indicative of audio content;

for posts having content with the file type of content being indicative of audio content, filtering content from the posts that include music media content in the post so as to separate music related posts from posts including other audio content;

providing content of the filtered music related posts to a content identification system;

receiving from the content identification system information indicating an identity of the content in the music related posts;

receiving from the content identification system samples of audio content associated with the identity of the content in the music related posts; and providing within the social network for the user profile the samples of audio content as posts in the social network for the user profile along with the information indicating the identity of the content in an order based on the filtering.

19. The method of claim 12, further comprising designating given related users of the social network as music influencers relative to other related users of the social network such that posts of the music influencers are given a higher priority compared to the other related users.

* * * * *